(12) United States Patent
Zhao et al.

(10) Patent No.: US 8,552,615 B2
(45) Date of Patent: Oct. 8, 2013

(54) ELECTRIC MOTORS HAVING EMI REDUCING CIRCUITS AND METHODS THEREFOR

(75) Inventors: Jiangang Zhao, Baltimore, MD (US); Paik Gu, Suzhou (CN); Zhanghe Song, Suzhou (CN); Shengjian Liu, Suzhou (CN)

(73) Assignee: Black & Decker Inc., Newark (DE)

( * ) Notice: Subject to any disclaimer, the term of this patent is extended or adjusted under 35 U.S.C. 154(b) by 350 days.

(21) Appl. No.: 12/817,958

(22) Filed: Jun. 17, 2010

(65) Prior Publication Data

US 2011/0018377 A1 Jan. 27, 2011

Related U.S. Application Data

(60) Provisional application No. 61/187,757, filed on Jun. 17, 2009.

(51) Int. Cl.
 *H02K 13/00* (2006.01)
(52) U.S. Cl.
 USPC .................................... 310/239; 310/68 R
(58) Field of Classification Search
 USPC ...... 310/68 R, 239, 233, 242, 68 B, 238, 220, 310/221, 237
 See application file for complete search history.

(56) References Cited

U.S. PATENT DOCUMENTS 4,348,603 A * 9/1982 Huber .............................. 310/50

FOREIGN PATENT DOCUMENTS

JP 62185596 A * 8/1987

OTHER PUBLICATIONS

Jp 62-185596 A translation Mar. 1, 2013.*

* cited by examiner

*Primary Examiner* — Tran Nguyen
*Assistant Examiner* — Leda Pham
(74) *Attorney, Agent, or Firm* — Amir Rohani; Adan Ayala

(57) ABSTRACT

An electric motor having a circuit for reducing electromagnetic interference (EMI) includes a field stack such as a stator, an armature including a shaft, a commutator mounted on the shaft, and an armature core electrically connected to the commutator, whereby the armature core is rotatably mounted within the field stack. The electric motor includes a brush assembly adapted to deliver electrical power to the commutator. The circuit includes a delta capacitor network and a conductive lead electrically interconnecting the delta capacitor network and the brush assembly. In one embodiment, the circuit includes motor field windings or coils, and a power source electrically interconnectable with the delta capacitor network and the motor field windings. In one embodiment, the motor is a universal motor.

10 Claims, 31 Drawing Sheets

Final Measurement Results

| Frequency MHz | QP Level dB | QP Limit dB | QP Delta dB |
|---|---|---|---|
| 0.18 | 65.88 | 74.49 | 8.61 |
| 0.54 | 68.2 | 69 | 0.8 |
| 0.6 | 68.64 | 69 | 0.36 |
| 1.275 | 57.72 | 69 | 11.28 |
| 2.985 | 45.66 | 69 | 23.34 |
| 4.23 | 46.4 | 69 | 22.6 |
| 15.105 | 44.08 | 74 | 29.92 |
| 22.41 | 38.48 | 74 | 35.52 |

| Frequency MHz | AV Level dB | AV Limit dB | AV Delta dB |
|---|---|---|---|
| 0.285 | 55.34 | 61.42 | 6.08 |
| 0.525 | 60.47 | 59 | -1.47 |
| 0.645 | 60.81 | 59 | -1.81 |
| 1.11 | 51.96 | 59 | 7.04 |
| 2.175 | 42.5 | 59 | 16.5 |
| 4.23 | 36.32 | 59 | 22.68 |
| 14.34 | 33.38 | 64 | 30.62 |
| 18.405 | 32.5 | 64 | 31.5 |

FIG. 6B

Final Measurement Results

| Frequency MHz | QP Level dB | QP Limit dB | QP Delta dB |
|---|---|---|---|
| 30 | 47 | 55 | 8 |
| 30.9 | 47.29 | 55.03 | 7.74 |
| 82.2 | 44.69 | 56.93 | 12.24 |
| 118.2 | 37.51 | 58.27 | 20.76 |
| 138 | 28.13 | 59 | 30.87 |
| 172.2 | 21.23 | 60.27 | 39.04 |
| 204.6 | 20.64 | 61.47 | 40.83 |
| 235.2 | 19.35 | 62.6 | 43.25 |
| 285.6 | 18.91 | 64.47 | 45.56 |

| Frequency MHz | AV Level dB | AV Limit dB | AV Delta dB |
|---|---|---|---|
| 30 | 27.91 | 45 | 17.09 |
| 94.44 | 24.71 | 47.39 | 22.68 |
| 97.68 | 24 | 47.51 | 23.51 |
| 135.48 | 16.47 | 48.91 | 32.44 |
| 165.54 | 14.25 | 50.02 | 35.77 |
| 199.92 | 13.24 | 51.29 | 38.05 |
| 232.68 | 13.02 | 52.51 | 39.49 |
| 274.62 | 13.7 | 54.06 | 40.36 |

FIG. 7B

Final Measurement Results

| Frequency MHz | QP Level dB | QP Limit dB | QP Delta dB |
|---|---|---|---|
| 0.15 | 67.01 | 76 | 8.99 |
| 0.39 | 64.15 | 69 | 4.85 |
| 0.6 | 60.66 | 69 | 8.34 |
| 1.965 | 50.75 | 69 | 18.25 |
| 2.7 | 48.63 | 69 | 20.37 |
| 4.875 | 43.36 | 69 | 25.64 |
| 9.885 | 39.1 | 74 | 34.9 |
| 29.55 | 33.04 | 74 | 40.96 |

| Frequency MHz | AV Level dB | AV Limit dB | AV Delta dB |
|---|---|---|---|
| 0.285 | 54.19 | 61.42 | 7.23 |
| 0.435 | 57.44 | 59 | 1.56 |
| 0.57 | 54.12 | 59 | 4.88 |
| 1.11 | 40.67 | 59 | 18.33 |
| 2.19 | 41.56 | 59 | 17.44 |
| 4.17 | 35.64 | 59 | 23.36 |
| 13.455 | 30.88 | 64 | 33.12 |
| 18.06 | 32.14 | 64 | 31.86 |

FIG. 8B

Final Measurement Results

| Frequency MHz | QP Level dB | QP Limit dB | QP Delta dB |
|---|---|---|---|
| 30 | 45.47 | 55 | 9.53 |
| 41.88 | 39.03 | 55.44 | 16.41 |
| 96.6 | 46 | 57.47 | 11.47 |
| 99.48 | 41.4 | 57.57 | 16.17 |
| 140.16 | 28.87 | 59.08 | 30.21 |
| 185.88 | 25.39 | 60.77 | 35.38 |
| 220.26 | 23.12 | 62.05 | 38.93 |
| 241.68 | 20.32 | 62.84 | 42.52 |
| 267.6 | 20.07 | 63.8 | 43.73 |

| Frequency MHz | AV Level dB | AV Limit dB | AV Delta dB |
|---|---|---|---|
| 30 | 28.74 | 45 | 16.26 |
| 30.36 | 28.68 | 45.01 | 16.33 |
| 92.46 | 27.4 | 47.31 | 19.91 |
| 97.86 | 24.38 | 47.51 | 23.13 |
| 131.34 | 18.02 | 48.75 | 30.73 |
| 165.36 | 16.54 | 50.01 | 33.47 |
| 199.38 | 14.4 | 51.27 | 36.87 |
| 232.5 | 13.91 | 52.5 | 38.59 |
| 266.33999 | 13.08 | 53.75 | 40.67 |

FIG. 9B

Final Measurement Results

| Frequency MHz | QP Level dB | QP Limit dB | QP Delta dB |
|---|---|---|---|
| 0.15 | 67.97 | 76 | 8.03 |
| 0.33 | 59.44 | 69.49 | 10.05 |
| 1.03499 | 57.49 | 69 | 11.51 |
| 1.89 | 59.78 | 69 | 9.22 |
| 2.385 | 59.08 | 69 | 9.92 |
| 4.83 | 56.02 | 69 | 12.98 |
| 13.395 | 53.03 | 74 | 20.97 |
| 16.05 | 51.94 | 74 | 22.06 |

| Frequency MHz | AV Level dB | AV Limit dB | AV Delta dB |
|---|---|---|---|
| 0.15 | 61.13 | 69 | 7.87 |
| 0.345 | 51.35 | 59.17 | 7.82 |
| 1.065 | 48.95 | 59 | 10.05 |
| 1.77 | 51.04 | 59 | 7.96 |
| 2.28 | 49.13 | 59 | 9.87 |
| 4.18499 | 45.67 | 59 | 13.33 |
| 14.91 | 41.53 | 64 | 22.47 |
| 18.885 | 41.06 | 64 | 22.94 |

FIG. 10B

Final Measurement Results

| Frequency MHz | QP Level dB | QP Limit dB | QP Delta dB |
|---|---|---|---|
| 30 | 45.48 | 55 | 9.52 |
| 31.08 | 43.34 | 55.04 | 11.7 |
| 94.26 | 36.82 | 57.38 | 20.56 |
| 107.4 | 37.48 | 57.87 | 20.39 |
| 143.76 | 27.66 | 59.21 | 31.55 |
| 185.7 | 22.83 | 60.77 | 37.94 |
| 230.7 | 22.04 | 62.43 | 40.39 |
| 238.26 | 23.72 | 62.71 | 38.99 |
| 285.42 | 19.03 | 64.46 | 45.43 |

| Frequency MHz | AV Level dB | AV Limit dB | AV Delta dB |
|---|---|---|---|
| 30 | 28.73 | 45 | 16.27 |
| 88.5 | 22.72 | 47.17 | 24.45 |
| 104.88 | 20.72 | 47.77 | 27.05 |
| 145.38 | 16.16 | 49.27 | 33.11 |
| 165.36 | 14.01 | 50.01 | 36 |
| 200.1 | 13.47 | 51.3 | 37.83 |
| 240.42 | 13.65 | 52.79 | 39.14 |
| 266.7 | 12.69 | 53.77 | 41.08 |

FIG. 11B

Final Measurement Results

| Frequency MHz | QP Level dB | QP Limit dB | QP Delta dB |
|---|---|---|---|
| 0.15 | 67.58 | 76 | 8.42 |
| 0.285 | 67.85 | 70.7 | 2.85 |
| 0.375 | 67.89 | 69 | 1.11 |
| 0.585 | 62.77 | 69 | 6.23 |
| 1.5 | 57.38 | 69 | 11.62 |
| 2.31 | 54.98 | 69 | 14.02 |
| 4.62 | 47.35 | 69 | 21.65 |
| 15.435 | 44.89 | 74 | 29.11 |
| 18.105 | 48.72 | 74 | 25.28 |

| Frequency MHz | AV Level dB | AV Limit dB | AV Delta dB |
|---|---|---|---|
| 0.15 | 50.5 | 69 | 18.5 |
| 0.285 | 47 | 61.42 | 14.42 |
| 0.525 | 47.5 | 59 | 11.5 |
| 0.57 | 47.43 | 59 | 11.57 |
| 1.125 | 41.24 | 59 | 17.76 |
| 3.555 | 33.38 | 59 | 25.62 |
| 4.995 | 33.87 | 59 | 25.13 |
| 12.135 | 27.5 | 64 | 36.5 |
| 19.71 | 35.87 | 64 | 28.13 |

FIG. 12B

Final Measurement Results

| Frequency MHz | QP Level dB | QP Limit dB | QP Delta dB |
|---|---|---|---|
| 30 | 41.02 | 55 | 13.98 |
| 30.72 | 39.09 | 55.03 | 15.94 |
| 92.46 | 32.15 | 57.31 | 25.16 |
| 118.02 | 37.18 | 58.26 | 21.08 |
| 132.6 | 33.98 | 58.8 | 24.82 |
| 170.22 | 32.95 | 60.19 | 27.24 |
| 207.48 | 28.28 | 61.57 | 33.29 |
| 233.04 | 23.32 | 62.52 | 39.2 |
| 276.42 | 20.13 | 64.13 | 44 |

| Frequency MHz | AV Level dB | AV Limit dB | AV Delta dB |
|---|---|---|---|
| 30 | 23.88 | 45 | 21.12 |
| 30.18 | 23.76 | 45.01 | 21.25 |
| 64.01999 | 19.34 | 46.26 | 26.92 |
| 114.24 | 19.73 | 48.12 | 28.39 |
| 150.78 | 20.51 | 49.47 | 28.96 |
| 165 | 18.15 | 50 | 31.85 |
| 199.74 | 16.43 | 51.29 | 34.86 |
| 234.3 | 14.27 | 52.57 | 38.3 |
| 266.33999 | 13.55 | 53.75 | 40.2 |

FIG. 13B

Final Measurement Results

| Frequency | QP Level | QP Limit | QP Delta |
|---|---|---|---|
| MHz | dB | dB | dB |
| 0.285 | 69.74 | 70.7 | 0.96 |
| 0.3 | 69.46 | 70.27 | 0.81 |
| 0.57 | 58.82 | 69 | 10.18 |
| 1.245 | 54.6 | 69 | 14.4 |
| 2.16 | 52.12 | 69 | 16.88 |
| 4.8 | 46.6 | 69 | 22.4 |
| 12.45 | 43.18 | 74 | 30.82 |
| 18.63 | 44.68 | 74 | 29.32 |

| Frequency | AV Level | AV Limit | AV Delta |
|---|---|---|---|
| MHz | dB | dB | dB |
| 0.285 | 49.47 | 61.42 | 11.95 |
| 0.375 | 49.24 | 59 | 9.76 |
| 0.57 | 44.65 | 59 | 14.35 |
| 1.545 | 42.4 | 59 | 16.6 |
| 2.16 | 39.4 | 59 | 19.6 |
| 4.6 | 32.5 | 59 | 26.5 |
| 14.43 | 28.02 | 64 | 35.98 |
| 18.95 | 28.63 | 64 | 35.37 |

FIG. 14B

Final Measurement Results

| Frequency MHz | QP Level dB | QP Limit dB | QP Delta dB |
|---|---|---|---|
| 30 | 42.2 | 55 | 12.8 |
| 30.18 | 41.92 | 55.01 | 13.09 |
| 56.68 | 34.43 | 57.17 | 22.74 |
| 114.6 | 29.85 | 58.13 | 28.28 |
| 150.6 | 35.74 | 59.47 | 23.73 |
| 166.08 | 26.12 | 60.04 | 33.92 |
| 212.52 | 28.29 | 61.76 | 33.47 |
| 235.2 | 26.53 | 62.6 | 36.07 |
| 274.8 | 22.61 | 64.07 | 41.46 |

| Frequency MHz | AV Level dB | AV Limit dB | AV Delta dB |
|---|---|---|---|
| 30 | 23.14 | 45 | 21.86 |
| 30.54 | 22.6 | 45.02 | 22.42 |
| 64.01999 | 16.73 | 46.26 | 29.53 |
| 97.5 | 15.72 | 47.5 | 31.78 |
| 149.34 | 18.31 | 49.42 | 31.11 |
| 178.7 | 15.04 | 50.43 | 35.39 |
| 200.54 | 13.95 | 51.32 | 37.37 |
| 233.4 | 13.65 | 52.53 | 38.88 |
| 266.33999 | 12.83 | 53.75 | 40.92 |

FIG. 15B

Final Measurement Results

| Frequency | QP Level | QP Limit | QP Delta |
|---|---|---|---|
| MHz | dB | dB | dB |
| 0.15 | 66.56 | 76 | 9.44 |
| 0.255 | 59.5 | 71.62 | 12.12 |
| 0.465 | 56.36 | 69 | 12.64 |
| 0.99 | 59.34 | 69 | 9.66 |
| 1.17 | 60.24 | 69 | 8.76 |
| 2.22 | 56.1 | 69 | 12.9 |
| 4.395 | 53.84 | 69 | 15.16 |
| 14.775 | 47.16 | 74 | 26.84 |
| 17.58 | 46.62 | 74 | 27.38 |

| Frequency | AV Level | AV Limit | AV Delta |
|---|---|---|---|
| MHz | dB | dB | dB |
| 0.15 | 50.06 | 69 | 18.94 |
| 0.285 | 45.1 | 61.42 | 16.32 |
| 0.525 | 42.15 | 59 | 16.85 |
| 0.99 | 43.45 | 59 | 15.55 |
| 1.2 | 43.84 | 59 | 15.16 |
| 2.22 | 40.74 | 59 | 18.26 |
| 4.26 | 39.7 | 59 | 19.3 |
| 7.98 | 34.72 | 64 | 29.28 |
| 17.58 | 34.04 | 64 | 29.96 |

FIG. 16B

Final Measurement Results

| Frequency MHz | QP Level dB | QP Limit dB | QP Delta dB |
|---|---|---|---|
| 30 | 43.14 | 55 | 11.86 |
| 55.02 | 36.39 | 55.93 | 19.54 |
| 85.8 | 35.68 | 57.07 | 21.39 |
| 112.8 | 31.98 | 58.07 | 26.09 |
| 137.82 | 30.25 | 58.99 | 28.74 |
| 197.4 | 27.68 | 61.2 | 33.52 |
| 211.8 | 30.48 | 61.73 | 31.25 |
| 237.36 | 22.5 | 62.68 | 40.18 |
| 288.84 | 22.43 | 64.59 | 42.16 |

| Frequency MHz | AV Level dB | AV Limit dB | AV Delta dB |
|---|---|---|---|
| 30 | 24.46 | 45 | 20.54 |
| 88.5 | 19.17 | 47.17 | 28 |
| 122.52 | 19.07 | 48.43 | 29.36 |
| 131.34 | 17.2 | 48.75 | 31.55 |
| 165.36 | 14.45 | 50.01 | 35.56 |
| 208.56 | 15.17 | 51.61 | 36.44 |
| 233.22 | 13.22 | 52.53 | 39.31 |
| 274.8 | 13.84 | 54.07 | 40.23 |

FIG. 17B

ELECTRIC MOTORS HAVING EMI REDUCING CIRCUITS AND METHODS THEREFOR

CROSS-REFERENCE TO RELATED APPLICATIONS

The present application claims benefit of U.S. Provisional Application Ser. No. 61/187,757, entitled "CIRCUIT FOR POWER TOOL," filed Jun. 17, 2009, the disclosure of which is hereby incorporated by reference herein.

BACKGROUND OF THE INVENTION

1. Field of the Invention

The present invention is generally related to electronic devices, and is more specifically related to circuits for reducing electromagnetic interference (EMI) generated by electric motors.

2. Description of the Related Art

Electromagnetic interference (EMI) is a disturbance that may interrupt, obstruct, degrade or limit the effective performance of an electronic circuit or electronic device. An EMI disturbance may be due to either electromagnetic conduction or electromagnetic radiation emitted from a source, such as an electric motor. Electromagnetic conduction and electromagnetic radiation are differentiated by the way the electromagnetic field propagates. Conducted EMI is caused by physical contact between conductors, and radiated EMI is caused by induction, without physical contact between conductors.

An EMI disturbance may result in adverse consequences including the uneven distribution of an electromagnetic field around a conductor, skin effects, proximity effects, hysteresis losses, transients, voltage drops, electromagnetic disturbances, EMP/HEMP, eddy current losses, harmonic distortion, and reduction in the permeability of a material.

One solution for minimizing a device's susceptibility to EMI is electromagnetic shielding. EMI shielding, however, is expensive and has negative consequences. Another method to reduce EMI involves twisting wires, however, many facilities have tens of thousands of feet of wire, so this solution is not always practical.

Another solution for minimizing EMI emissions includes providing an electronic device with an EMI filter. For example, U.S. Pat. No. 6,400,058 to Liau discloses a universal motor having reduced EMI emission characteristics. The universal motor has a stator, a rotor, and brushes. The EMI filter includes a filter circuit provided on a printed circuit board (PCB). The PCB including the filter circuit is mounted over the brushes on the motor. When electrical arcing occurs between the commutator and the brushes, the PCB filter acts as a shield that absorbs a portion of the radiation emitted by the arcing so as to reduce the EMI characteristics of the universal motor.

Most countries have legal requirements that mandate the electromagnetic compatibility of devices that produce electromagnetic fields. These legal requirements mandate that equipment manufacturers produce electronic devices that work properly when subjected to certain levels of EMI, and that do not emit EMI at levels that will interfere with other equipment.

In 1982, the United States enacted Public Law 97-259, which granted the Federal Communications Commission (FCC) the authority to regulate consumer electronic equipment for EMI. After the law was promulgated, the FCC worked with equipment manufacturers to develop acceptable EMI standards for electronic hardware.

Under the FCC compliance program, electronic devices must be tested to insure that they meet acceptable EMI standards. There are generally three types of EMI compliance tests: emission testing, immunity testing, and safety testing. Emission testing insures that a product will not emit harmful interference by electromagnetic radiation. In one emission test, one or more antennas are used to measure the amplitude of the electromagnetic waves emitted by a device. The amplitude of the emitted waves must be under a set limit, with the limit depending upon the classification of the device. Immunity testing insures that a product is immune to common electrical signals and EMI disturbances that will be found in its operating environment, such as electromagnetic radiation from a local radio station or interference from nearby products. Safety testing insures that a product will not create a safety risk from situations such as a failed or shorted power supply, and power line voltage spikes and dips.

One type of EMI testing device is sold under the trademark R&S® ESU by Rohde & Schwarz GmbH & Co. The R&S® ESU device combines a testing receiver and a spectrum analyzer in one component. The R&S® ESU device makes a wide variety of measurements related to EMI testing including peak, AV, RMS, CISPR-AV and quasi-peak measurements.

In spite of the above advances, there remains a need for improved, reliable, and economical EMI reducing circuits for electronic devices that minimize the likelihood of EMI disturbances and that meet or exceed FCC standards.

SUMMARY OF THE INVENTION

In one embodiment, an electric motor, such as a universal motor, preferably includes an electromagnetic interference (EMI) reducing circuit. The motor preferably has a field including a field lamination stack and coils, an armature including an armature lamination stack, a shaft, a commutator mounted on the shaft, a winding coil electrically connected to the commutator, whereby the armature is rotatably mounted within the field stack, and a brush assembly adapted to deliver electrical power to the commutator. The brush assembly may include brushes and a brush box.

In one embodiment, the circuit preferably includes a delta capacitor network and a conductive lead electrically interconnecting the delta capacitor network and the brush assembly, either directly to the brush or indirectly to brush through the brush box if the brush box is made of electrically conductive material (e.g. brass or steel). The delta capacitor network preferably includes three capacitors. In one embodiment, the circuit may include field windings or field coils, and a power source electrically interconnectable with the delta capacitor network and the field coils.

In one embodiment, the conductive lead electrically interconnecting the delta capacitor network and the brush assembly desirably includes an electrical component adapted to reduce EMI emissions. The electrical component may be a resistor, an LC combination or a choke.

In one embodiment, a circuit for reducing electromagnetic interference (EMI) emitted by an electric motor preferably includes a field, an armature, a brush assembly adapted to deliver electrical power between the field and the armature, a delta capacitor network, and a conductive lead electrically interconnecting the delta capacitor network and the brush assembly. In one embodiment, the circuit may also include a power source electrically interconnectable with the delta capacitor network and the field coils. The delta capacitor network desirably includes three capacitors, and the brush assembly may have brushes and a brush box.

In one embodiment, a method for reducing the electromagnetic interference (EMI) emissions of an electric motor desirably includes providing a motor having a field including a field lamination stack and coils, an armature including an armature lamination stack, a shaft, a commutator mounted on the shaft, and a winding coil electrically connected to the commutator, whereby the armature is rotatably mounted within the field stack, and a brush assembly adapted to deliver electrical power to the commutator. The method preferably includes forming a circuit having a field stack, a brush assembly adapted to deliver electrical power to the field stack, motor field windings, and a delta capacitor network. The method desirably includes electrically interconnecting the delta capacitor network and the brush assembly.

The electrical interconnection may be formed using a conductive lead. In one embodiment, the electrically interconnecting step preferably includes using an electrical component adapted to reduce EMI emissions for forming at least a portion of the electrical interconnection between the delta capacitor network and the brush assembly. The electrical component for reducing EMI may be a resistor, an LC combination or a choke.

These and other preferred embodiments of the present invention will be described in more detail below.

BRIEF DESCRIPTION OF THE DRAWING

FIG. 6B is a table showing the measured results from the graph in FIG. 6A.
FIG. 7B is a table presenting the results related to the graph of FIG. 7A.
FIG. 8B is a table presenting the conducted band test results related to FIG. 8A.
FIG. 9B is a table presenting the radiated band test results related to the graph of FIG. 9A.
FIG. 10B is a table presenting the conducted band test results related to the graph of FIG. 10A.
FIG. 11B is a table presenting the radiated band test results related to the graph of FIG. 11A.
FIG. 12B is a table presenting the conducted band test results related to the graph of FIG. 12A.
FIG. 13B is a table presenting the radiated band test results related to the graph of FIG. 13A.
FIG. 14B is a table presenting the conducted band test results related to the graph of FIG. 14A.
FIG. 15B is table presenting the radiated band test results related to the graph of FIG. 15A.
FIG. 16B is a table presenting the conducted band test results related to the graph of FIG. 16A.
FIG. 17B is a table presenting the radiated band test results related to the graph of FIG. 17A.

DETAILED DESCRIPTION

Figure 1:
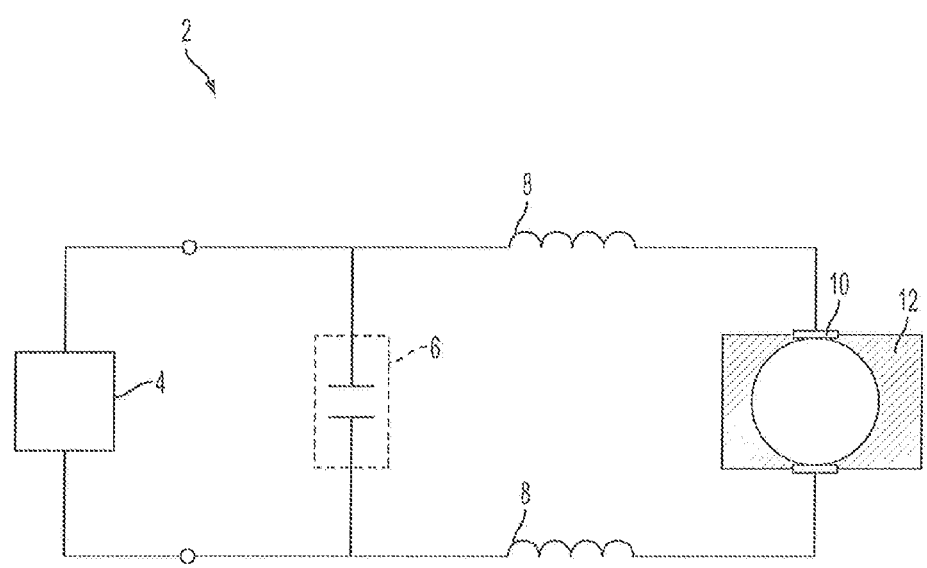
FIG. 1 is a schematic diagram of a prior art circuit.

FIG. 1 shows a schematic diagram of a prior art circuit 2 for a universal electric motor. For simplicity, only some of the components of the motor circuit are illustrated. The circuit 2 includes a power source 4 connected with a two lead capacitor network 6, commonly referred to as an X capacitor network. The circuit includes motor field windings 8, brushes and a brush box 10, and a field stack 12. The power source 4 may be an alternating current (AC) or a direct current (DC) power source.

Figure 2:
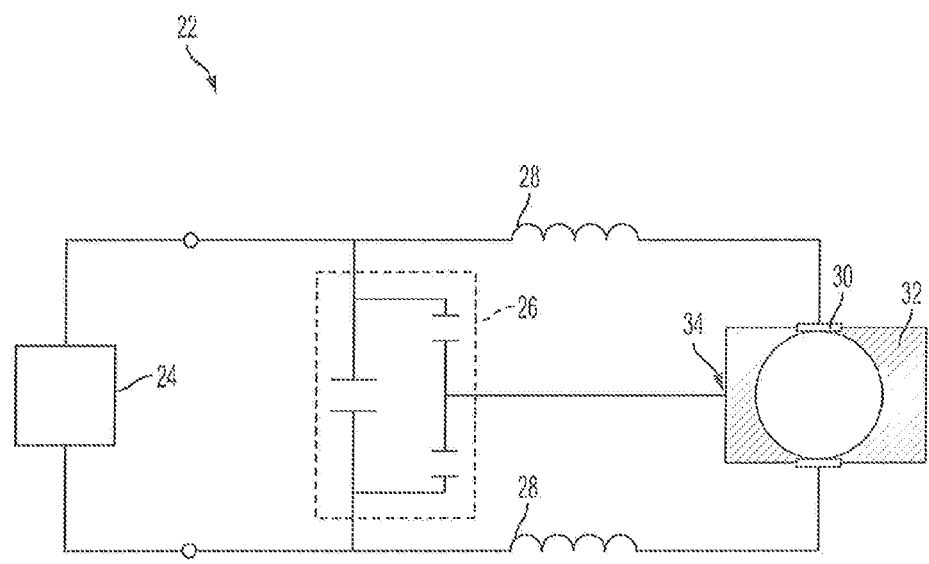
FIG. 2 is a schematic diagram of a prior art circuit.

FIG. 2 shows a schematic diagram of a second prior art circuit 22 for a universal electric motor. For simplicity, only some of the components of the motor circuit are illustrated. The circuit 22 includes a power source 24, a capacitor network 16, motor field windings 28, brushes and a brush box 30, and a field stack 32. The circuit 22 also includes a lead wire 34 that interconnects one of the leads of the capacitor network 26 with the field stack 22. In the FIG. 2 embodiment, the capacitor network 26 is a Delta capacitor network.

Figure 3:
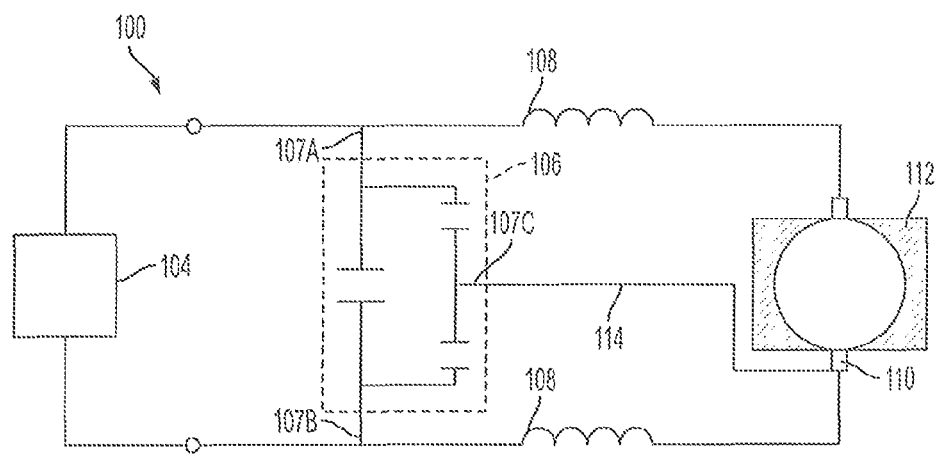
FIG. 3 is a schematic diagram of a circuit for an electric motor including an electromagnetic interference (EMI) reducing component, in accordance with one embodiment of the present invention.

Referring to FIG. 3, in one embodiment, an EMI reducing circuit 100 for an electric motor, such as a universal motor, preferably includes a power source 104 connected with a Delta capacitor network 106 having three leads 107A, 107B, and 107C. For simplicity, only some of the components of the preferred motor circuit are illustrated. The EMI reducing circuit 100 preferably includes motor field windings 108, brushes and a brush box 110, and a field stack 112. The EMI reducing circuit 100 desirably includes a lead wire 114 that interconnects the third capacitor lead 107C of the Delta capacitor network 106 with the brush and/or the brush box 110.

Figure 4:
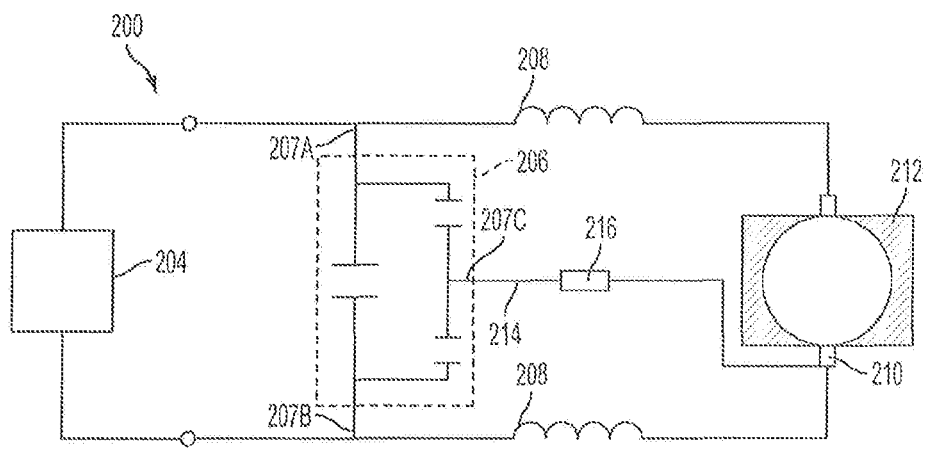
FIG. 4 is a schematic diagram for an electric motor including an EMI reducing component, in accordance with one embodiment of the present invention.

Referring to FIG. 4, in one embodiment, an EMI reducing circuit 200 for an electric motor preferably includes a power source 204 coupled with a Delta capacitor network 206 having a first lead 207A, a second lead 207B and a third lead 207C. For simplicity, only some of the components of the preferred motor circuit are illustrated. The EMI reducing circuit 200 preferably includes motor field windings 208, brushes and a brush box 210, and a field stack 212. The EMI reducing circuit 200 desirably includes a lead wire 214 coupling the third capacitor lead 207C of the Delta capacitor network 206 with the brush and/or the brush box 210. The lead wire 214 preferably includes an additional EMI reducing component 216 such as a resistor, an LC, or a choke. Thus, in one embodiment, the additional EMI reducing component 216 is desirably disposed between and coupled with one of the leads of the Delta capacitor network 206 and the brush and/or the brush box 210.

Figure 5A:
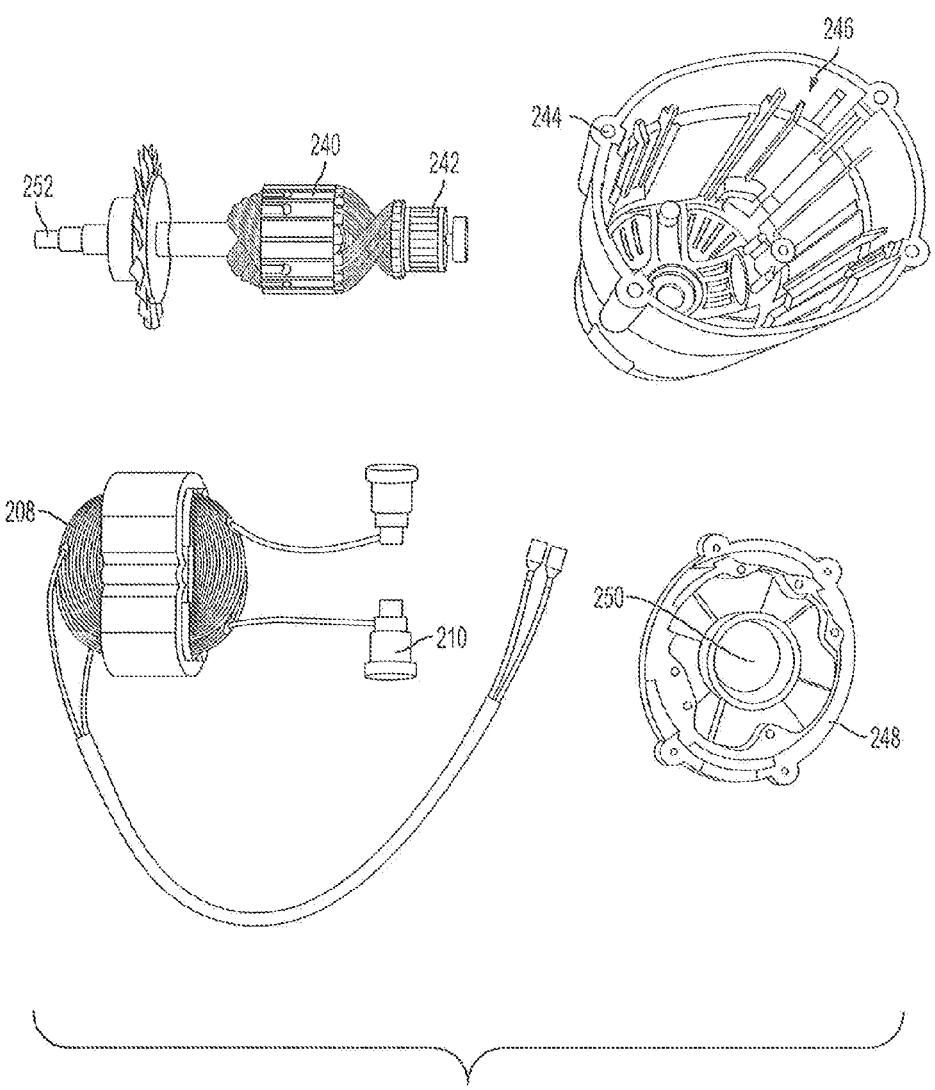
FIGS. 5A-5E show an electric motor, in accordance with one embodiment of the present invention.
Figure 5B:
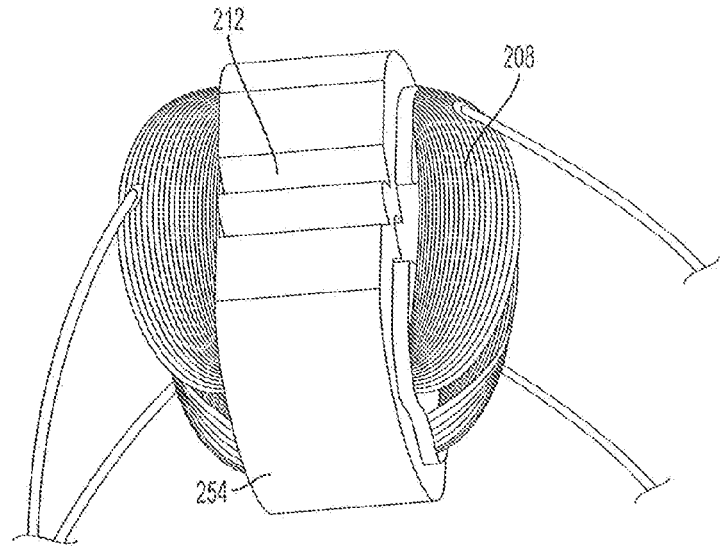
Figure 5C:
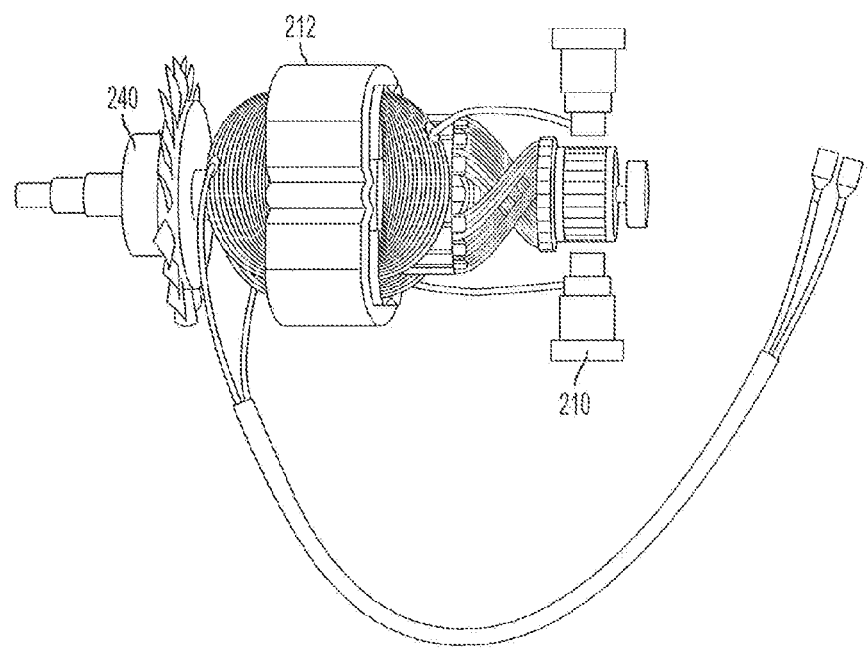
Figure 5D:
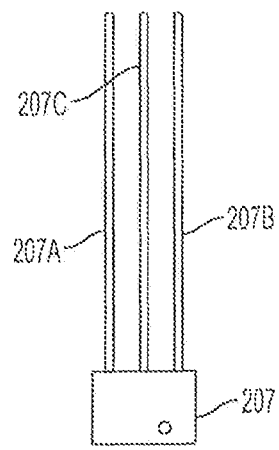
Figure 5E:
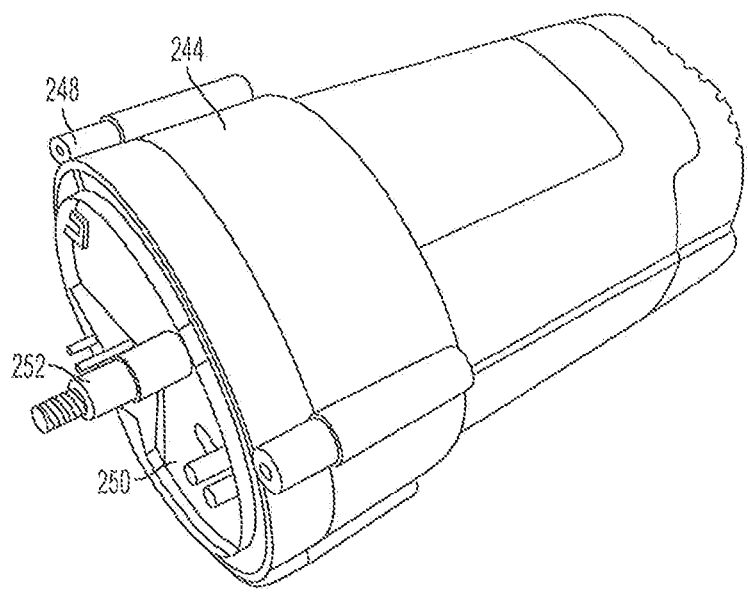

Referring to FIGS. 5A-5E, in one embodiment, an electric motor preferably includes a field stack 212 having field coils or field windings 208. The motor also desirably includes a brush assembly 210 including a brush box and a brush. The motor desirably includes an armature 240 having a commutator 242. In one embodiment, the electric motor desirably includes a field case 244 having a central opening 246 adapted to receive the field stack 212 and the armature 240. The electric motor desirably includes an end plate 248 securable to an end of the field case 244. The end plate 248 preferably includes a central opening 250 adapted to receive a shaft 252 on the armature 240. FIG. 5B shows the field stack 212 including a field lamination 254 and the field coils 208. FIG. 5C shows the armature rotatably mounted within the field stack 212. The brush assembly 210 is accessible outside the field stack 212. FIG. 5D shows a Delta capacitor network 206 as described above in the circuit shown in FIG. 4. The Delta capacitor network 206 desirably includes a first lead 207A, a second lead 207B, and a third lead 207C. FIG. 5E shows the electric motor assembled inside the field case 244 with the end plate 248 covering an end of the field case 244. The shaft 252 of the armature 240 extends through the central opening 250 in the end plate 248.

As noted above, pursuant to Public Law 97-259, the FCC has enabled equipment manufacturers to implement a voluntary compliance program for minimizing EMI disturbances. The circuits disclosed in FIGS. 3 and 4 are preferred embodiments of the present invention that insure that authorized EMI levels are not exceeded. More particularly, the preferred circuits of FIGS. 3 and 4 desirably minimize emitted noise levels in electronic components so as to maintain a buffer or safety zone of at least 3-5 dB from the acceptable standard without requiring additional expensive EMI reducing components found in prior art systems. Although the present invention is not limited by any particular theory of operation, it is believed that providing a circuit with an electrical connection between one of the capacitor leads of a Delta capacitor network and the brush or brush box of an electric motor reduce the EMI noise without requiring additional expensive components. Set forth below are graphs and tables that show the EMI test results for two different electrical devices when using the prior art circuits of FIGS. 1 and 2 and the preferred circuit of FIG. 4. As will be discussed in more detail below, the circuit of FIG. 4 exceeds the EMI standards by more than 5 dB, however, the circuits of FIGS. 1 and 2 fail to meet EMI standards at all of the measured frequencies.

In order to confirm the EMI reducing benefits provided by the preferred circuits disclosed in the present invention, the circuits were placed in electronic devices and EMI testing was conducted. The first electronic device tested for EMI compliance was a Black & Decker power tool having model number LAG D28492. The specifications of the electric motor used with the LAG D28492 power tool are well-known to those of ordinary skill in the art. FIGS. 6A-6B and 7A-7B show the respective conducted band and radiated band test results for the prior art circuit of FIG. 1; FIGS. 8A-8B and 9A-9B show the respective conducted band and radiated band test results for the prior art circuit of FIG. 2; and FIGS. 10A-10B and 11A-11B show the respective conducted band and radiated band test results for the preferred circuit of FIG. 4.

Figure 6A:
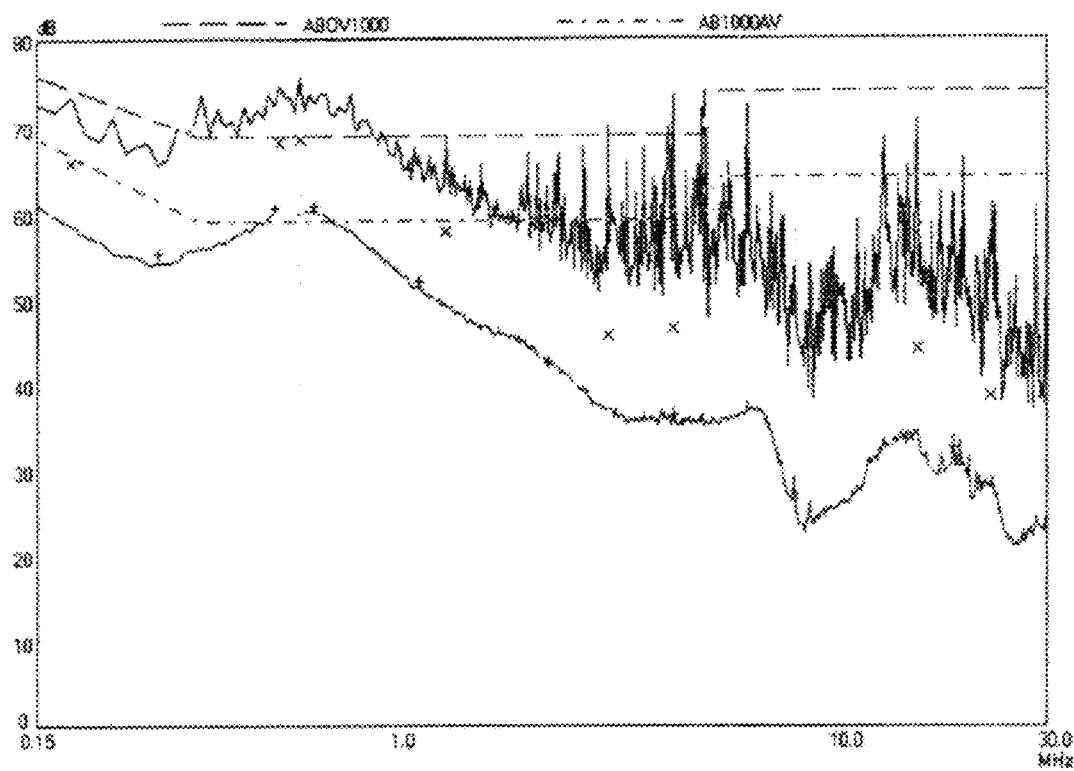
FIG. 6A is a graph illustrating conducted band test results for the prior art circuit shown in FIG. 1.

More specifically, FIG. 6A is a graph illustrating EMI test results for the prior art circuit of FIG. 1 incorporated into the Black and Decker power tool identified by model number LAG D28492. The desired noise level safety zone is preferably 3-5 dB. The graph in FIG. 6A illustrates the conducted band test results achieved using the prior art circuit of FIG. 1. The table shown in FIG. 6B illustrates the conducted band test results plotted in the graph of FIG. 6A. As shown in the table of FIG. 6B, the first prior art circuit shown in FIG. 1 does not satisfy the quasi-peak (QP) Delta values for the frequencies at 0.54 MHz and 0.6 MHz. At 0.54 MHz, the QP Delta is 0.8 dB and at 0.6 dB the QP Delta is 0.36 dB. At a frequency of 0.525 MHz, the average value (AV) Delta reading is −1.47 dB, and at 0.645 MHz, the AV Delta is −1.81 dB. These conducted band test results indicate that the prior art circuit of FIG. 1 does not meet the desired EMI "safety" zone of at least 3-5 dB.

Figure 7A:
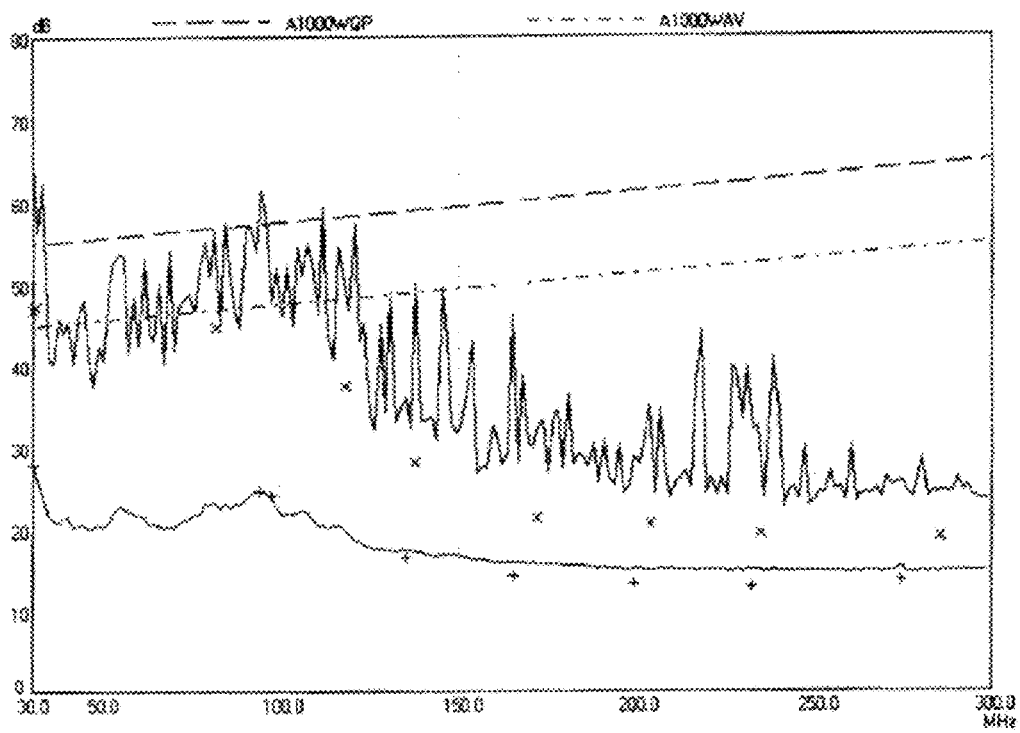
FIG. 7A is a graph illustrating radiated band test results for the prior art circuit of FIG. 1.

FIGS. 7A and 7B show the radiated band test results for the LAG D28492 power tool when using the prior art circuit of FIG. 1. As shown in the table of FIG. 7B, the circuit of FIG. 1 satisfactorily passes the EMI test because the QP Delta and AV Delta values for all of the measured frequencies are above the 3-5 dB safety zone. Although the circuit of FIG. 1 satisfactorily passed the radiated band test, the circuit of FIG. 1 is not acceptable because it did not meet the standards for the conducted band test described above in FIGS. 6A and 6B.

Figure 8A:
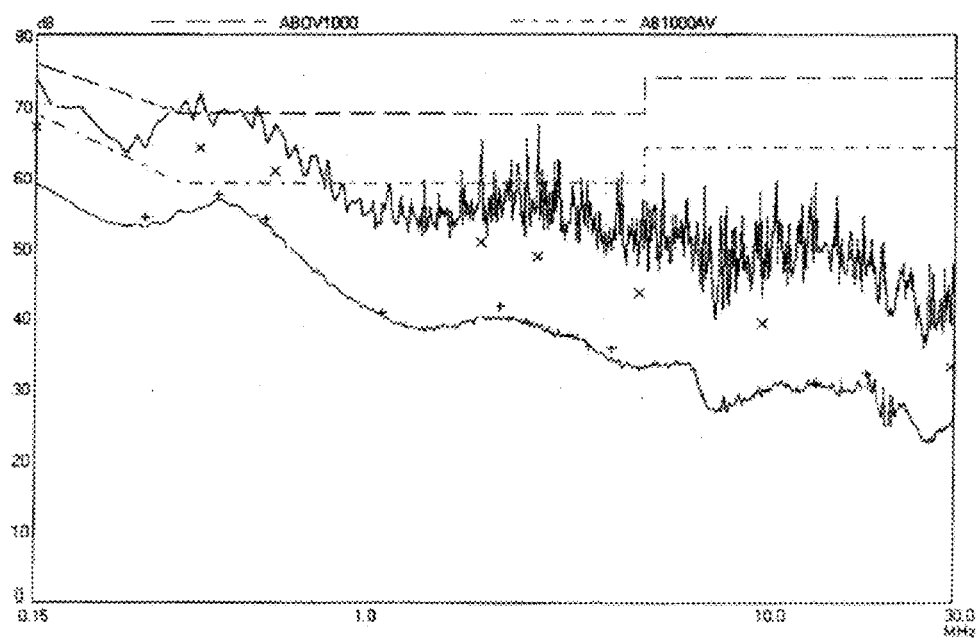
FIG. 8A is a graph illustrating conducted band test results for the prior art circuit of FIG. 2.

FIGS. 8A and 8B show a graph and a table illustrating the EMI test results for the prior art circuit of FIG. 2 when the circuit is incorporated into the Black & Decker power tool LAG D28492. As shown in the conducted band test results table of FIG. 8B, the prior art circuit of FIG. 2 does not satisfy the 3-5 dB buffer standard, having a QP Delta of 4.85 dB at 0.39 MHZ, an AV Delta of 1.56 dB at 0.435 MHZ, and an AV Delta of 4.88 dB at 0.57 MHz.

Figure 9A:
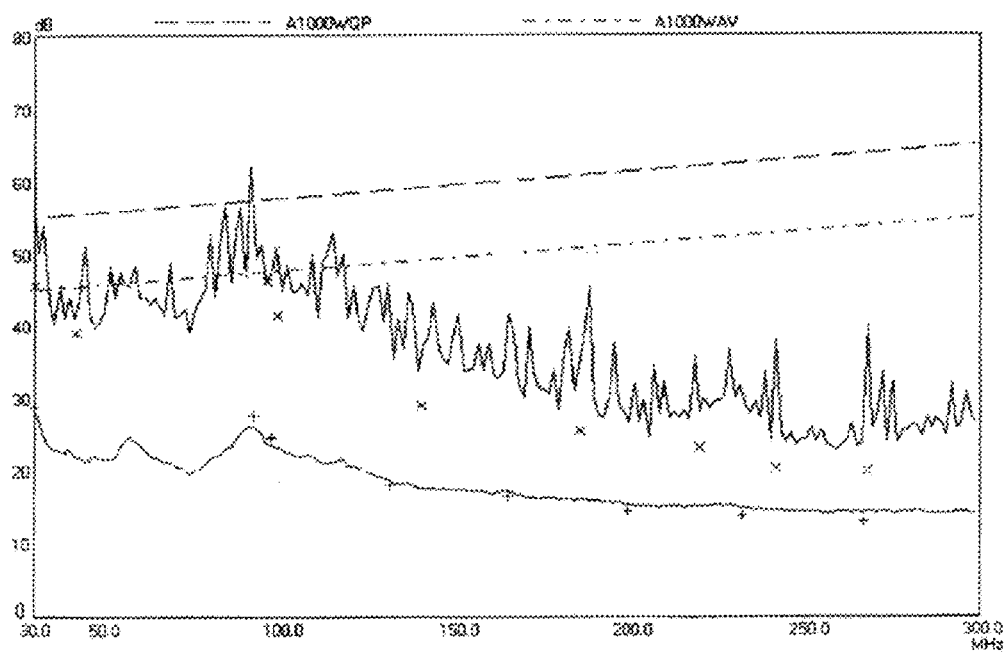
FIG. 9A is a graph illustrating radiated band test results for the circuit of FIG. 2.

FIGS. 9A and 9B show the radiated band results for the circuit of FIG. 2 when incorporated into the Black & Decker power tool model number LAG D28492. The circuit of FIG. 2 meets the EMI standards at all of the tested frequencies, however, the circuit of FIG. 2 remains unacceptable because it did not satisfy the EMI standards for the conducted band test described above in FIGS. 8A and 8B.

Figure 10A:
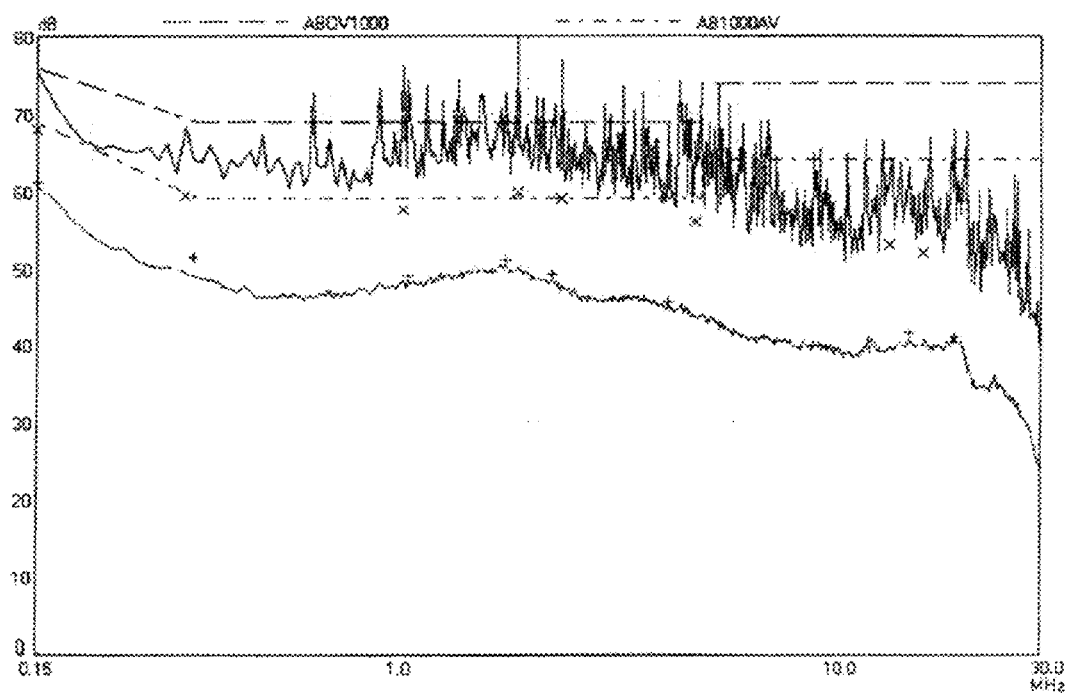
FIG. 10A is a graph illustrating conducted band test results for the circuit of FIG. 4, in accordance with one embodiment of the present invention.

FIGS. 10A and 10B show a graph and a table, respectively, illustrating the conducted band test results when incorporating the preferred circuit of FIG. 4 into the Black & Decker power tool model number LAG D28492. As shown therein, the circuit of FIG. 4 exceeds the 3-5 dB safety zone at all of the measured frequencies.

Figure 11A:
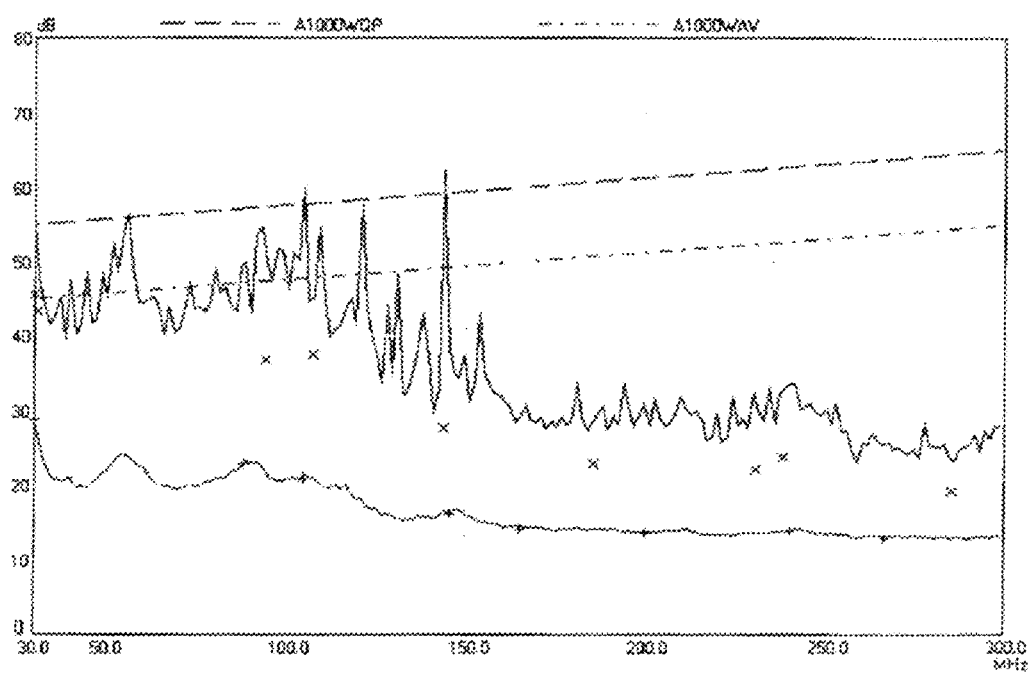
FIG. 11A is a graph illustrating radiated band test results for the circuit of FIG. 4, in accordance with one embodiment of the present invention.

FIGS. 11A and 11B show a graph and a table, respectively, illustrating the radiated band test results when incorporating the preferred circuit of FIG. 4 into the Black & Decker power tool model number LAG D28492. As shown in FIGS. 11A and 11B, the circuit of FIG. 4 exceeds the 3-5 dB buffer zone at all of the tested frequencies. Thus, the circuit of FIG. 4 exceeds the 3-5 dBb safety zone specification so that it may be reliably incorporated into the power tool LAG D28492 for minimizing EMI.

Figure 12A:
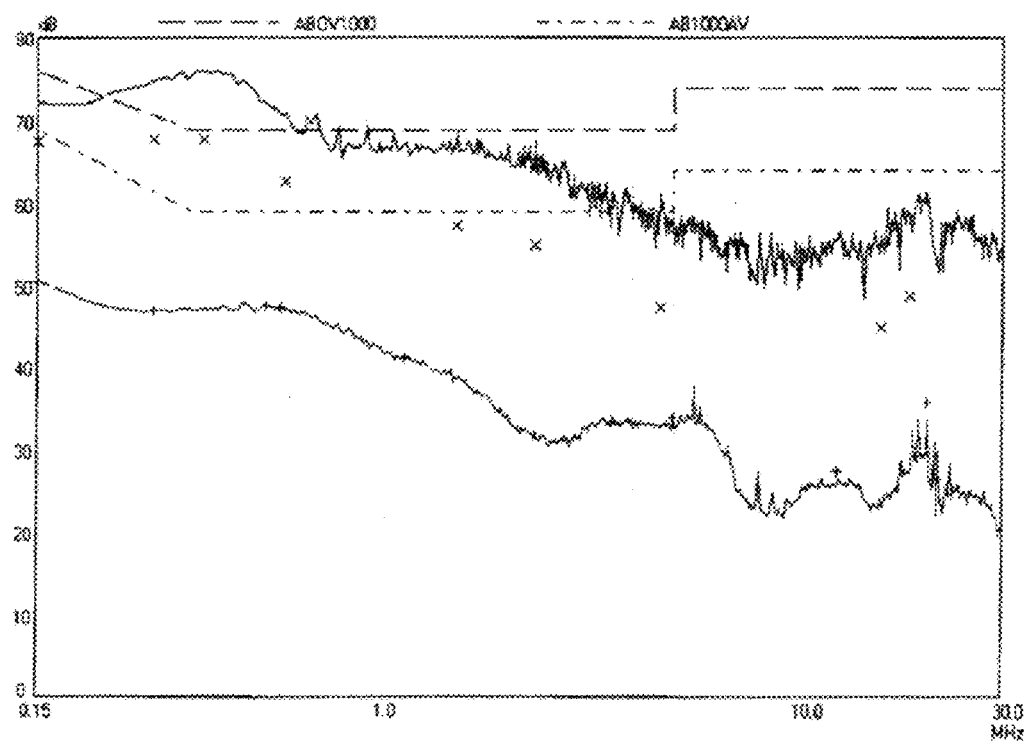
FIG. 12A is a graph illustrating the conducted band test results for the prior art circuit of FIG. 1.

FIGS. 12A-12B and 13A-13B show the EMI test results for the prior art circuit of FIG. 1 incorporated into the Black & Decker polisher model number DW849, having electric motor specifications well-known to those of ordinary skill in the art. FIG. 12A shows a plotting of the conducted band test results. As shown in the table of FIG. 12B, the prior art circuit of FIG. 1 falls below the 3-5 dB safety zone standard, having a QP Delta of 2.85 dB at 0.285 MHz and 1.11 dB at 0.375 MHz.

Figure 13A:
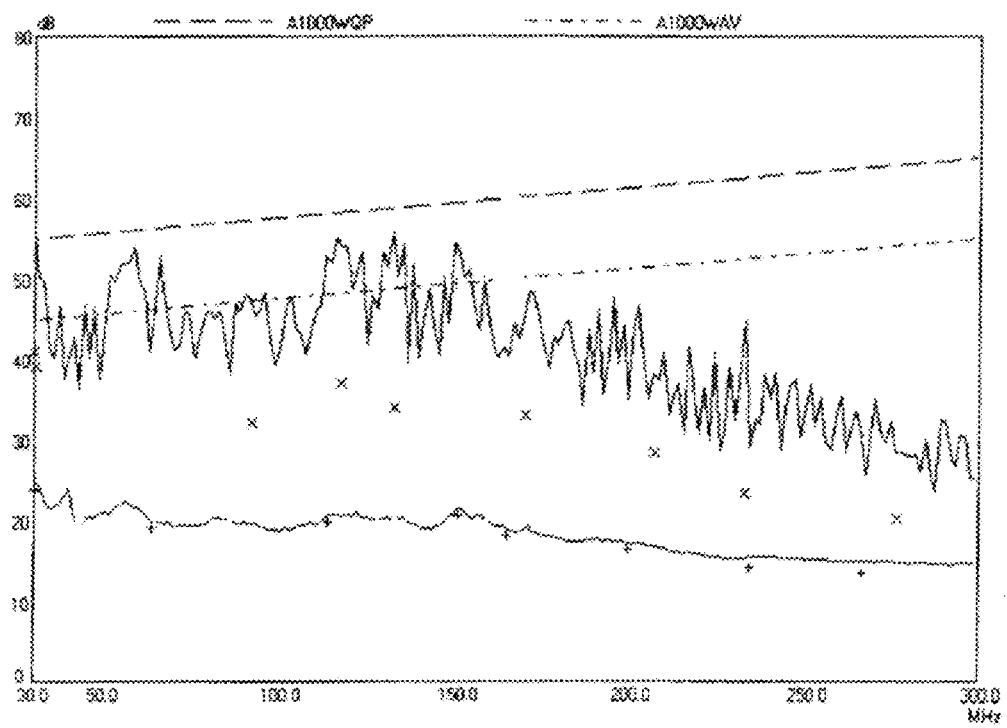
FIG. 13A is a graph illustrating the radiated band test results for the prior art circuit of FIG. 1.

FIGS. 13A-13B show radiated band test results for the prior art circuit of FIG. 1 incorporated into the Black &

Decker polisher model number DW849. As shown in the table of FIG. 13B, the prior art circuit of FIG. 1 exceeds the 3-5 dB standard at all frequencies, however, the circuit does not satisfy EMI standards because it did not pass the conducted band test as described above for FIGS. 12A and 12B.

Figure 14A:
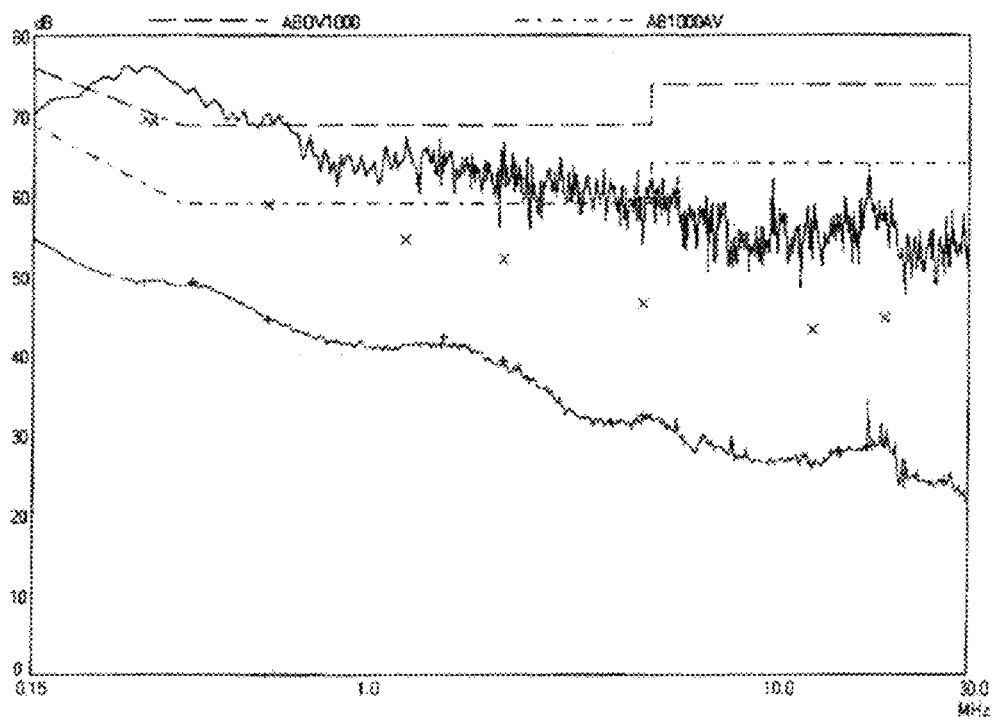
FIG. 14A is a graph illustrating conducted band results for the prior art circuit of FIG. 2.

FIGS. 14A and 14B show a graph and a table, respectively, illustrating the EMI test results for the prior art circuit of FIG. 2 incorporated into the Black & Decker polisher DW849. The graph and the table illustrate the conducted band results. The circuit of FIG. 2 is not acceptable for meeting the 3-5 dB safety standard because the circuit has a QP Delta of 0.96 dB at a frequency of 0.285 MHz, and 0.81 dB at a frequency of 0.3 MHz.

Figure 15A:
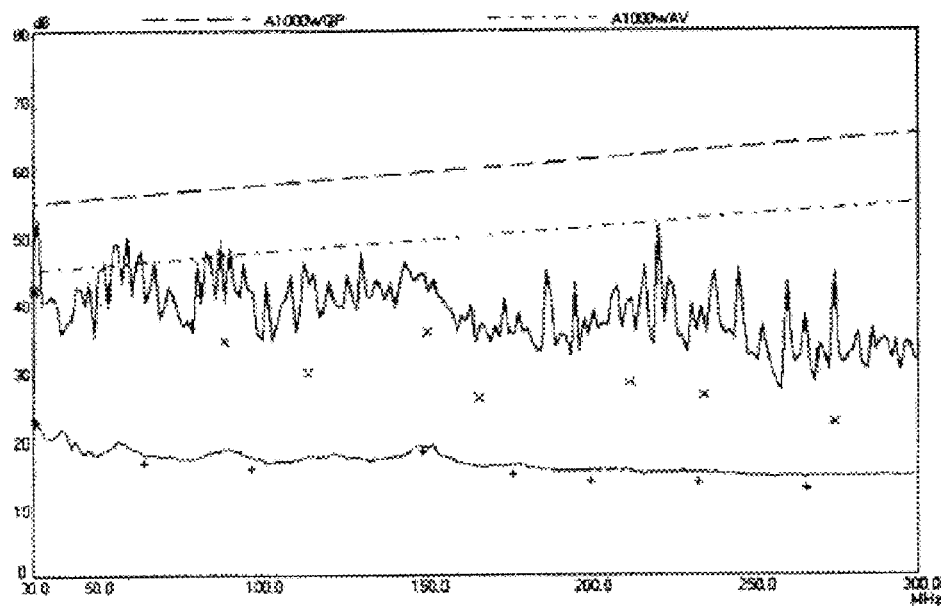
FIG. 15A is a graph presenting the radiated band test results for the prior art circuit of FIG. 2.

FIGS. 15A and 15B show the radiated band test results for the prior art circuit of FIG. 2 when incorporated into the power tool DW849. As shown in the table of FIG. 15B, the circuit exceeds 3-5 dB for the QP Delta and AV Delta results at all frequencies, however, the circuit is not acceptable because it did not pass the conducted band test results shown in FIGS. 14A and 14B.

Figure 16A:
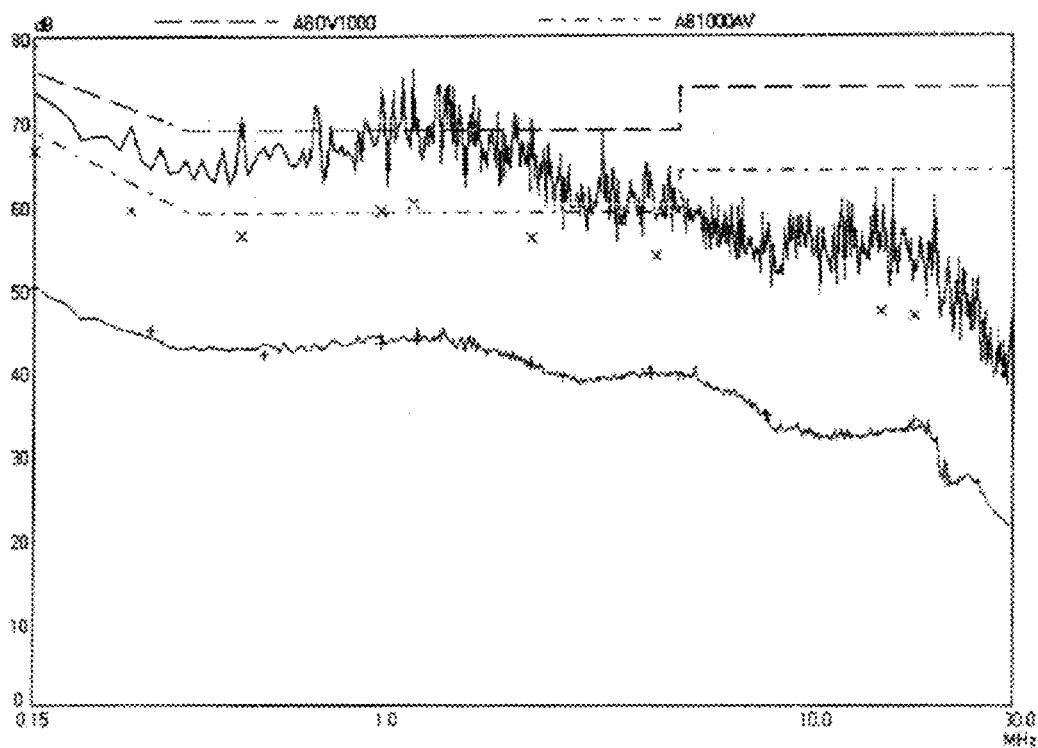
FIG. 16A is a graph illustrating the conducted band test results for the circuit of FIG. 4, in accordance with one embodiment of the present invention.

FIGS. 16A and 16B show a graph and a table, respectively, illustrating EMI test results for the preferred circuit of FIG. 4 incorporated into the Black & Decker polisher DW849. FIGS. 16A and 16B illustrate the conducted band results. As shown in the table of FIG. 16B, the circuit of FIG. 4 exceeds the 3-5 dB specification standard at all measured frequencies.

Figure 17A:
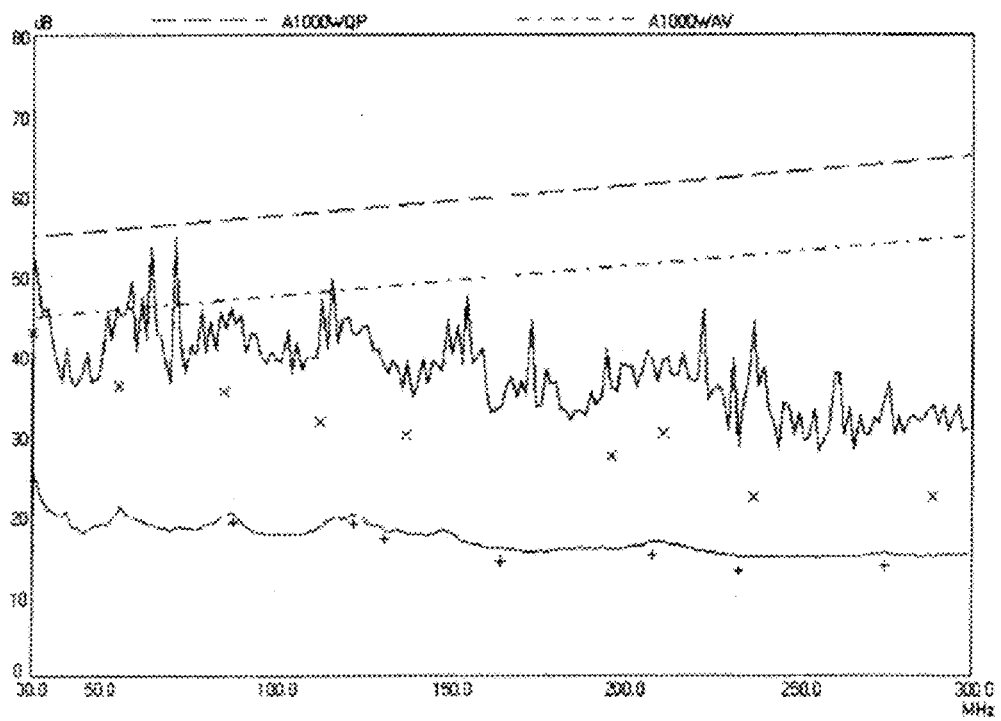
FIG. 17A is a graph illustrating the radiated band test results for the circuit of FIG. 4.

FIGS. 17A and 17B show a graph and a table, respectively, illustrating EMI test results for the preferred circuit of FIG. 4 incorporated into the Black & Decker polisher DW849. FIGS. 17A and 17B illustrate the radiated band results. As shown in the table of FIG. 17B, the circuit of FIG. 4 exceeds the 3-5 dB specification standard at all frequencies.

Although the present invention is not limited by any particular theory of operation, it is believed that the EMI reducing circuits shown in FIGS. 3 and 4 provide efficient, cost-effective structures for minimizing EMI disturbances without requiring additional, expensive EMI reducing components. As shown in the test results herein, the circuits of FIGS. 3 and 4 provide distinct advantages over the prior art circuits shown in FIGS. 1 and 2 by exceeding the 3-5 dB safety zone standard at all measured frequencies for both conducted band and radiated band tests.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. An electric motor including an electromagnetic interference (EMI) reducing circuit comprising:
    a field stack;
    an armature including a shaft;
    a commutator mounted on said shaft;
    an armature core electrically connected to said commutator, wherein said armature core is rotatably mounted within said field stack;
    motor field coils;
    a brush assembly adapted to deliver electrical power to said commutator;
    said circuit including a delta capacitor network comprising three capacitors and conductive leads electrically interconnecting two leads of said delta capacitor network with said motor field coils and a third lead of said delta capacitor network with said brush assembly, wherein said conductive lead electrically interconnecting said third lead of said delta capacitor network and said brush assembly comprises an electrical component adapted to reduce EMI emissions.

2. The electric motor as claimed in claim 1, further comprising an electrical component adapted to reduce EMI emissions coupling said delta capacitor network and said brush assembly.

3. The electric motor as claimed in claim 1, wherein said circuit further comprises:
    a power source electrically interconnectable with said delta capacitor network and said motor field coils.

4. The electric motor as claimed in claim 1, wherein said brush assembly comprises brushes and a brush box.

5. The electric motor as claimed in claim 1, wherein said electrical component is selected from the group consisting of a resistor, an LC combination and a choke.

6. A circuit for reducing electromagnetic interference (EMI) emitted by an electric motor comprising:
    a field stack;
    a brush assembly adapted to deliver electrical power to said field stack;
    motor field coils;
    a delta capacitor network comprising three capacitors; and
    conductive leads electrically interconnecting two leads of said delta capacitor network with said motor field coils and a third lead of said delta capacitor network with said brush assembly, wherein said conductive lead electrically interconnecting said third lead of said delta capacitor network and said brush assembly comprises an electrical component adapted to reduce EMI emissions.

7. The circuit as claimed in claim 6, further comprising:
    a power source electrically interconnectable with said delta capacitor network and said motor field coils.

8. The circuit as claimed in claim 6, wherein said brush assembly comprises brushes and a brush box.

9. The circuit as claimed in claim 6, wherein said electrical component is selected from the group consisting of a resistor, an LC combination and a choke.

10. A method for reducing electromagnetic interference (EMI) emissions of an electric motor comprising:
    providing a motor including
        a field stack,
        an armature including a shaft,
        a commutator mounted on said shaft,
        an armature core electrically connected to said commutator, wherein said armature core is rotatably mounted within said field stack, and
        a brush assembly adapted to deliver electrical power to said commutator;
    forming a circuit including
        said field stack;
        a brush assembly adapted to deliver electrical power to said field stack;
        motor field coils;
        a delta capacitor network comprising three capacitors; and
    electrically interconnecting two leads of said delta capacitor network with said motor field coils and a third lead of said delta capacitor network with said brush assembly, wherein the electrically interconnecting step includes using a component adapted to reduce EMI emissions for forming at least a portion of the electrical interconnection between said third lead of said delta capacitor network and said brush assembly.

* * * * *